No. 888,672. PATENTED MAY 26, 1908.
W. E. TRUFANT.
MACHINE FOR MANUFACTURING LASTS.
APPLICATION FILED APR. 11, 1901.
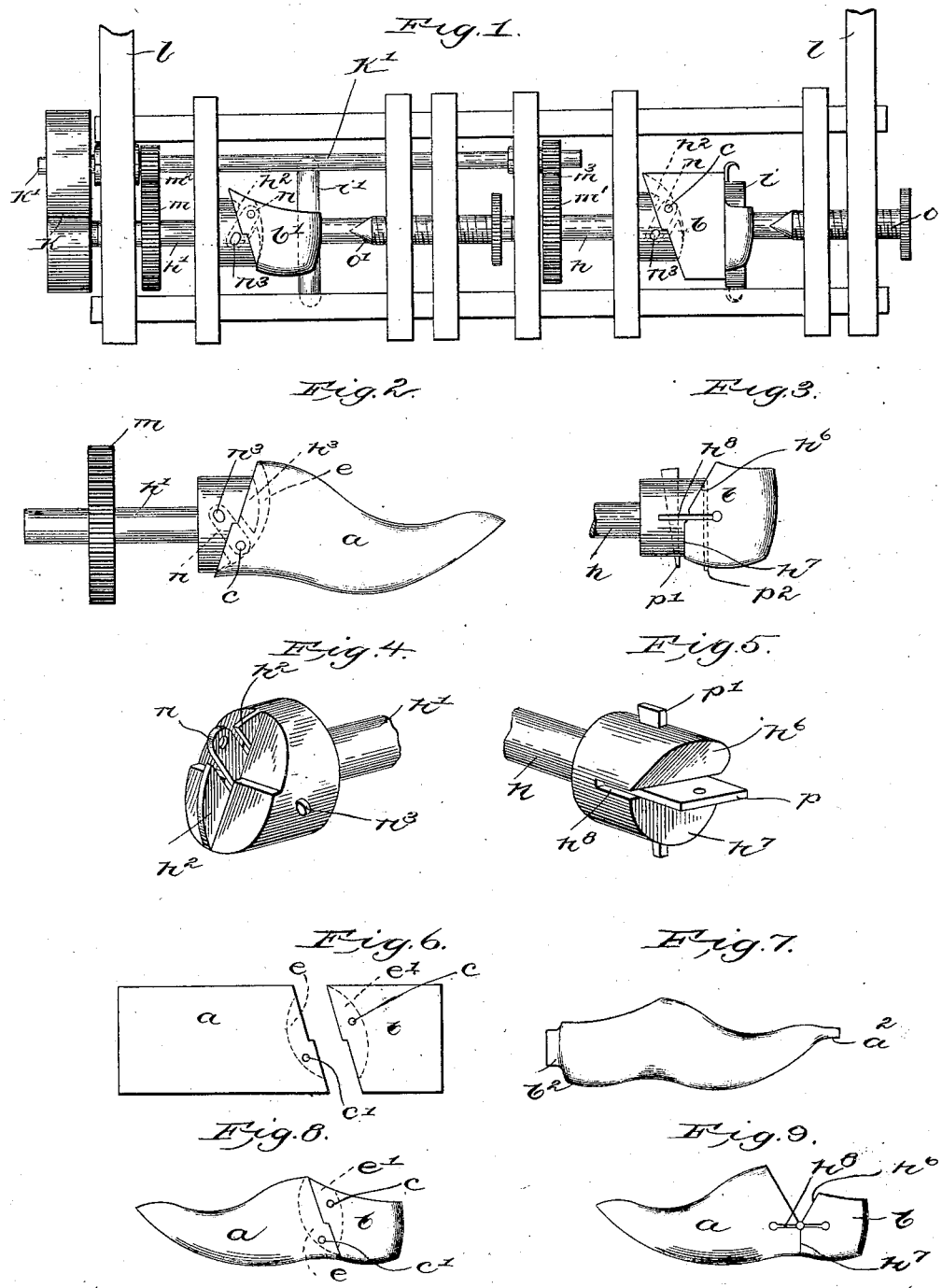
Witnesses.
Inventor.
Walter E. Trufant
by Crosby Gregory
attys.

UNITED STATES PATENT OFFICE.

WALTER E. TRUFANT, OF WHITMAN, MASSACHUSETTS.

MACHINE FOR MANUFACTURING LASTS.

No. 888,672.  Specification of Letters Patent.  Patented May 26, 1908.

Application filed April 11, 1901. Serial No. 55,397.

*To all whom it may concern:*

Be it known that I, WALTER E. TRUFANT, a citizen of the United States, residing at Whitman, county of Plymouth, State of Massachusetts, have invented an Improvement in Machines for Manufacturing Lasts, of which the following description, in connection with the accompanying drawings, is a specification, like letters on the drawings representing like parts.

My invention relates to the manufacture of multi-part or divided lasts, one variety of which, commonly known as hinged lasts, has come into quite general and extensive use in shoe manufacture within a few years. As at present manufactured, these lasts are first turned in block form by Blanchard or pattern lathes and then they are sawed in two and the hinge or other connecting device is inserted and secured, but when the severed parts are brought against each other after the sawing they do not register with each other because of the removal, by the saw-kerf, of a thin cross-section of material and the result is that considerable labor and skill are required to shave down the parts and make a smooth joint; also the shape of the last is changed so that it no longer corresponds to the model. In practice this is a more serious difficulty than would appear at first glance, because not only is the last shortened by the width of the saw-cut, but this shortening is not uniform, as it is usually the case that the saw-cut cannot be made smooth and even, by the jigs commonly employed, and hence the cut ends require evening-off, thereby removing still more material, the amount thereof depending upon the irregularity which may have occurred in making the saw-cut; and also as the last is usually severed at the waist where the sides and bottom of the last slope inwardly, it follows that a considerable narrowing of the sides of the rear-part or heel-part at the curve is necessary in order to make the abutting surfaces smooth and level with each other.

I have pointed out above merely those difficulties and disadvantages which pertain to the last itself, but there are still other difficulties which result from the present manufacture, residing in getting the parts in proper relative position, in getting the fastenings properly located, and in getting the parts joined together. Accordingly I have devised a hereinafter described means for obviating the aforesaid difficulties.

Instead of turning the last as a one-piece block, I first sever the block, before it is turned, and get the abutting surfaces and connection holding parts in finished shape. Then I secure the respective parts to a special chuck which holds them in the precise position which they are intended to occupy in use, leaving exposed all the sides excepting the one which has been completed, and which, in use, abuts against another part of the last. The exposed sides of the block are then automatically turned, by any usual pattern lathe, being brought to the precise shape of the pattern. The result is that not only is the individual last made precisely as desired, not being shortened by subsequent joining of the parts, nor altered in shape, arrangement, or in any respect whatever, but all the similar parts are identical, and therefore interchangeable, so that it no longer becomes necessary to keep the original two parts of a block together until joined in a finished last, but any heel-part may be secured to any fore-part of a given size, style and width.

The details of my invention will be more fully pointed out in the course of the following description, reference being had to the accompanying drawings, illustrative of one embodiment of my invention, and the latter will be more particularly pointed out in the appended claims.

In the drawings, Figure 1 is a fragmentary detail in longitudinal section of a portion of a usual pattern lathe provided with my improvement; Figs. 2 and 3 are views in side elevation showing my improvement applied respectively to a toe-part and a heel-part of different kinds of divided lasts; Figs. 4 and 5 are perspective views of special forms of my improved chucks; Fig. 6 represents, in side elevation, the manner in which I treat a block; Fig. 7 is a similar view illustrating the present method employed in the manufacture of lasts; Figs. 8 and 9 represent, in side elevation, certain types of lasts, the former showing a finished last of the kind represented in block in Fig. 6, this being the kind of last described in my Patent, No. 633,741, of September 26, 1899, and the latter figure showing another form of the hinged last.

I have not deemed it necessary to show herein all the details of the turning lathe, as my invention is readily applicable to any style of pattern lathe, or, as it is sometimes called, Blanchard lathe, and accordingly I have shown merely the swinging frame of the lathe, which is hung on suitable arms $l$ in usual manner to coöperate with a guide-wheel $i'$ and cutter $i$, the work being held at the right-hand end of the frame, Fig. 1, and the pattern at the left-hand end thereof, a pattern being shown at $b'$, and the work being indicated at $b$ and indicated as partly turned, these parts $b'$, $b$, being shown as carried on my special chuck or attachment $h$, $h'$, these two chucks being herein shown as precisely the same in shape and construction, and rotated by gears $m$, $m'$ in mesh with pinions $m^2$, $m^3$, carried by a shaft $k'$ driven by any suitable means, as by a belt pulley $k$. Usual centers $o$, $o'$, may be employed, if desired, for a purpose presently to be explained.

As heretofore practiced, the last-block would be secured between a center $o$ and a usual head-piece occupying the position of my improved chuck, the pattern being similarly held at the left-hand end, Fig. 1, and the block would then be turned down to the shape shown in Fig. 7, leaving stub portions $a^2$, $b^2$, at the toe and heel, these stub portions being unavoidable because of the holding means engaging the same, then after these stub portions had been removed the last would be cut in parts, according to the kind of divided last being made, and thereafter all the expensive and objectionable finishing, shaving and dressing-down would follow, as already fully explained. Instead of following this method, which necessarily results in a defective last and cannot produce uniform lasts, I take the original block and divide the same along the lines of cut of the kind of last being made, as shown in Fig. 6, the opposite faces of the severed ends being then brought to the precise shape and finish required, it being relatively unimportant how much of the material is removed in getting the proper shape, as it cannot affect the final shape of the last, inasmuch as no turning has yet taken place.

Having brought the two faces into accurate and finished form I make the proper recesses for the hinge, or other connection, said recesses being herein shown as mortises $e$, $e'$, for containing a connecting link, as shown by my before mentioned patent. When the said mortises have been made in finished form and the abutting ends trued precisely as required and proper pivot holes $c$, $c'$, made for the link, to be subsequently used, the blocks $a$ and $b$ are ready to be turned. Let it be supposed that the block $b$ is to be turned first. It is put on a chuck $h$, said chuck having a face corresponding at its outer receiving or engaging end to the precise shape of the trued end of the block $b$, and having a rib $h^2$ entering the recess $e$ or $e'$, said rib being cut away to permit a special locking device in the form of a link $n$ from said chuck also to enter the recess, said link being preferably secured in the chuck by a tapered pin or tightening device $n^3$, so that it occupies the same position relatively to the chuck and block that the retaining link or device occupies in the last relatively to the fore-part and heel-part. The chuck $h'$ for holding the pattern $b'$ is identical at its receiving end with the chuck $h$ just described.

It will be understood that the receiving face and holding means of the chuck will be varied according to the kind of last-part which is to be held thereby, as, for instance, in Fig. 3, I have shown the chuck formed for retaining the heel-end of another last, and in this case the face of the chuck, instead of having two approximately parallel surfaces with an offset or jog between them, as in the previously described chuck, has two surfaces $h^6$, $h^7$, extending obliquely to each other to a meeting point, at which there is a longitudinal recess or slit $h^8$ for receiving a link $p$ secured in the chuck and in the piece $b$, respectively, by pins $p'$, $p^2$, the said link occupying the same position in said parts that the hinge does in the last, see Fig. 9. The result is that in each instance the portion of the last block is held in precisely the same position that the corresponding part of the last occupies in use, and all the sides of said block, excepting the secant face of the block which has been trued, extend freely exposed to be turned down to entirely finished and completed shape in the lathe without removal or further manipulation.

Not only does the block project without contact with any support at its free end so that said end may be turned down to shape without interference with any support, but the chuck itself and its locking device engage the secant face of the block within the peripheral limits thereof, that is to say the block extends freely laterally on all sides of said chuck so that the chuck and locking device do not interfere in any manner with the turning of the longitudinal sides of the block. In other words, the block is so held, at one point or place, by engaging means, which act on a limited part of one face thereof and on the interior of the block, that the entire block, with the exception of said trued secant face, can be at once turned down to finished shape. After the extreme free end of the block has been turned down to shape, the center $o$ may be run up against the same, if desired, for relieving the chuck somewhat from the strain brought thereon by the turning.

It will be understood that I am not limited to the precise details of construction herein shown and described, as the gist of my invention resides in providing means for retaining a block which has been trued and finished at one end, in such position that all the remaining sides thereof are exposed and held in proper position for automatic turning in a pattern lathe, as by this means all the hand work or special lathe work which has heretofore been necessary is entirely done away with, and it is made certain that all the resulting last-parts thus turned will be identical, and therefore interchangeable, while the lasts themselves will be unvaried in length and shape for any given size, width and style. This feature of having perfect interchangeability of parts by reason of their having been first properly trued or finished to identical shape on their secant faces is one of the leading, and, in fact, the most important feature of my invention, as it permits any heel-part to be used with any fore-part, as above explained.

In the claims I have used the words "joint end of a last-part" to designate the trued end of the block at the hinge joint, and I mean the claims to be restricted thereby to the shape which said trued and finished end of the part $a$ or $b$ has when dressed down and completely finished for union with another part of the last.

Having described my invention what I claim as new and desire to secure by Letters Patent, is:—

1. A pattern lathe for turning divided lasts and the like, comprising a cutter, a guide for controlling the cutter, means for holding the pattern, engaging means provided with an angular face and a rib projecting from said face transversely to its angle, means for holding the joint-end of the last-part against said angular face with the said transverse rib in a previously formed slot or kerf of said last-part, whereby transverse or rotative movement of said last-part with respect to said retaining means is prevented.

2. In the manufacture of divided lasts and the like in which a last-part has its joint-end provided with a connection recess for coöperating with the abutting end of a contiguous last-part, a pattern turning lathe provided with means for engaging the joint-end of a last-part, the engaging end of said means being smaller than said joint-end for engaging the latter within the limits thereof, leaving the remaining part to be turned down on all sides to the required shape, said means having a rib or projection fitting within the recess of said last-part, and a locking device projecting from the engaging end of said means in line with said rib to enter the recess of the last-part for locking the latter immovably, and cutting means for turning the last-part on all sides.

3. A pattern lathe for turning divided lasts and the like, comprising a cutter, a guide for controlling the cutter, means for holding the pattern, engaging means provided with an angular face and a rib projecting from said face transversely to its angle, means for holding the joint-end of the last-part against said angular face with the said transverse rib in a previously formed slot or kerf of said last-part, whereby transverse or rotative movement of said last-part with respect to said engaging means is prevented, means for pulling the said last-part tightly into rigid contact with said angular face.

4. A pattern lathe for turning that form of divided lasts provided at the joint-end with a slot or kerf for the hinge, said lathe comprising a cutter, a guide for controlling the cutter, means for holding the pattern, a chuck having an angular face corresponding to the angular joint-end of the last-part and also having a thin projecting rib adapted to enter the slot or kerf in the last-part, means for fastening the last-part in position on said chuck.

In testimony whereof, I have signed my name to this specification, in the presence of two subscribing witnesses.

WALTER E. TRUFANT.

Witnesses:
GEO. H. MAXWELL,
H. J. SARTORIS.